Oct. 6, 1970  J. L. AKER  3,533,060
INDICATOR FOR DISTANCE MEASURING EQUIPMENT
Filed Aug. 25, 1966  4 Sheets-Sheet 1
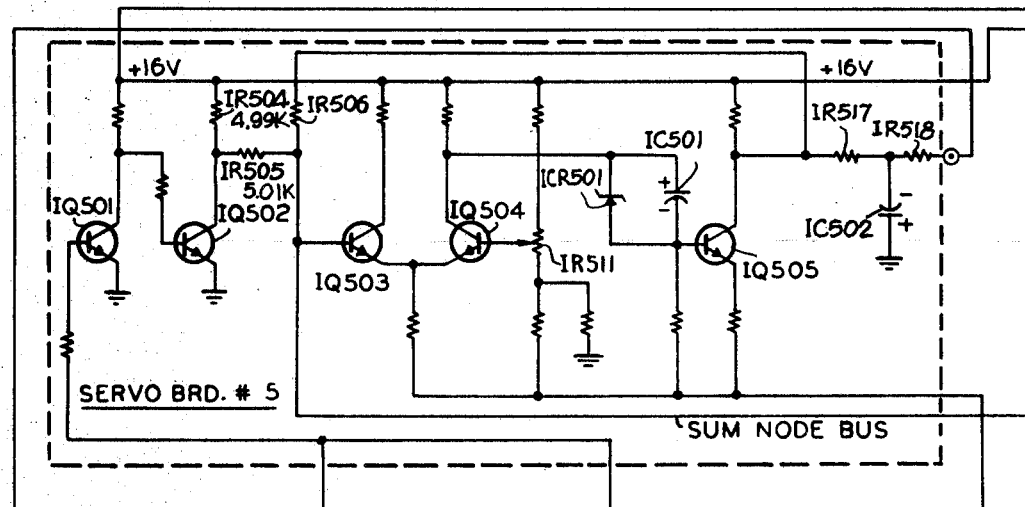
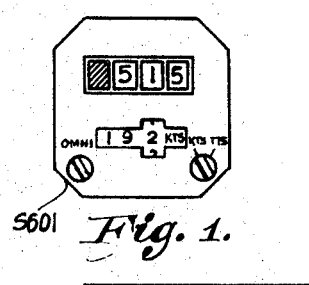
Fig. 1.
Fig. 6.
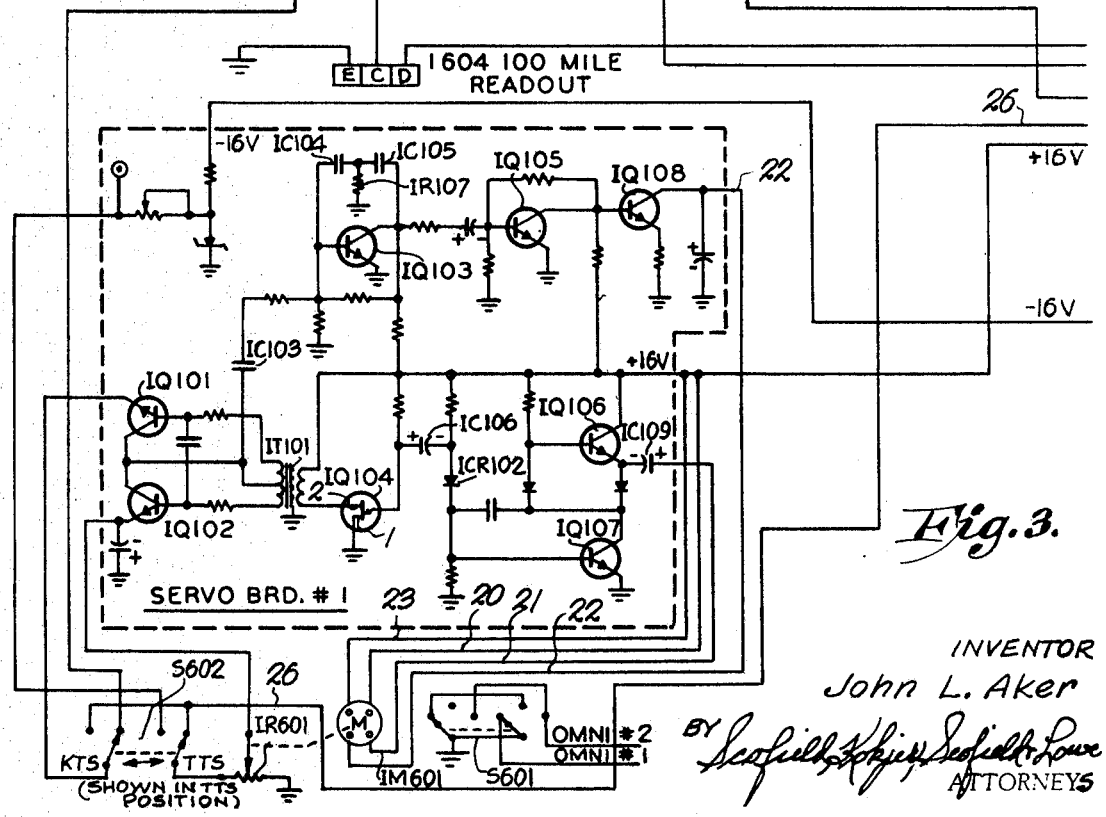
Fig. 3.
INVENTOR
John L. Aker
ATTORNEYS INVENTOR
John L. Aker
BY Seofield, Kolyer, Seofield & Lowe
ATTORNEYS

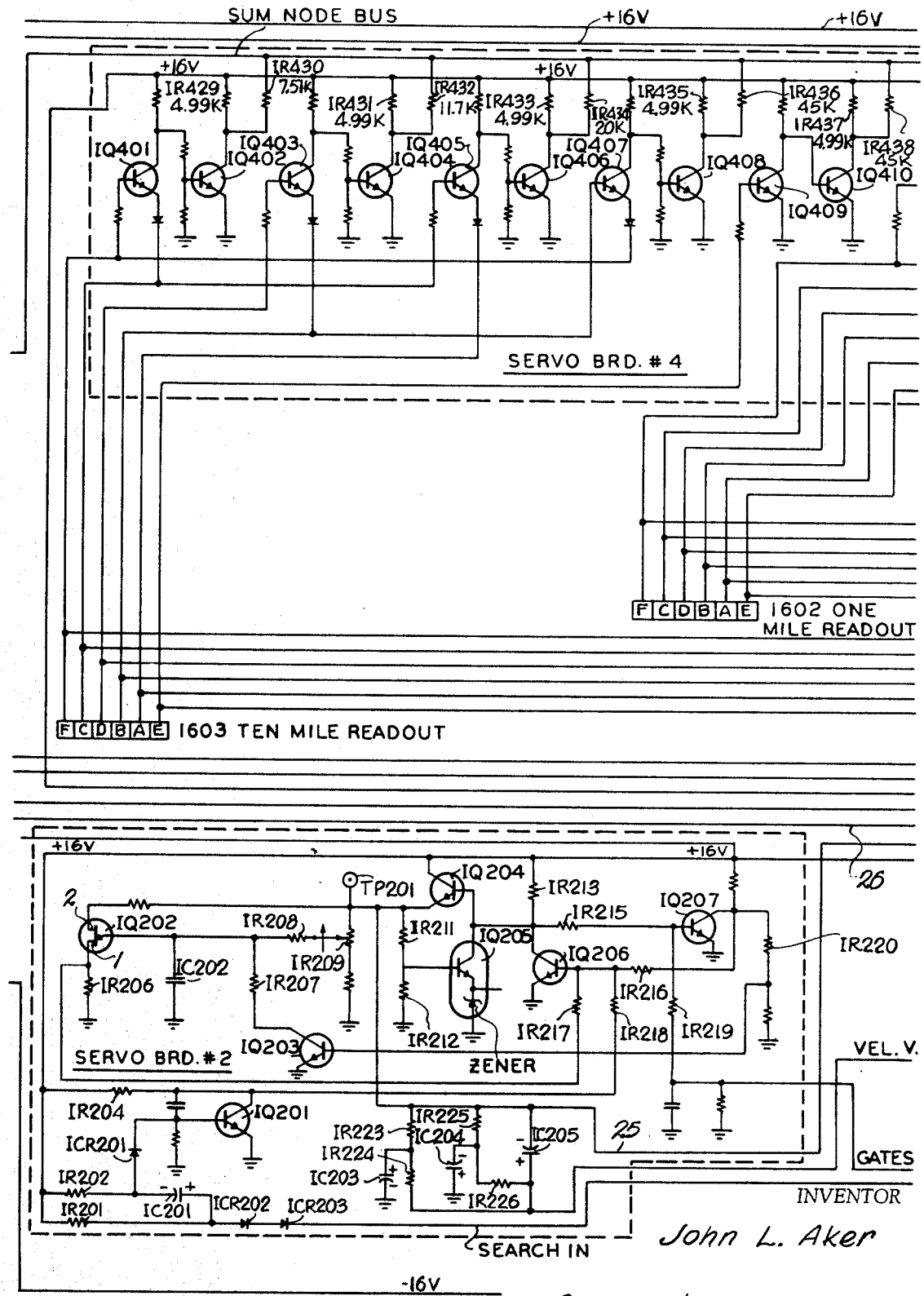

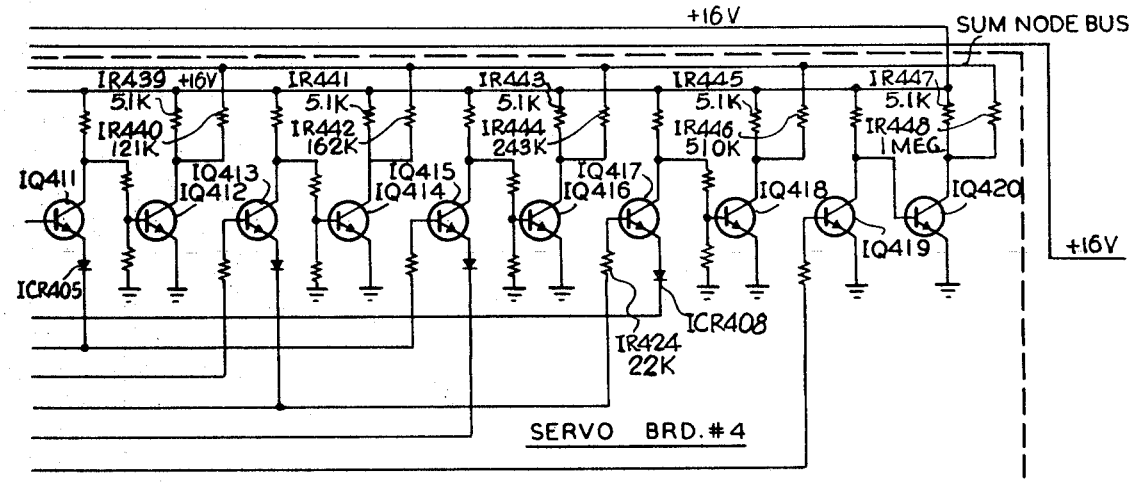
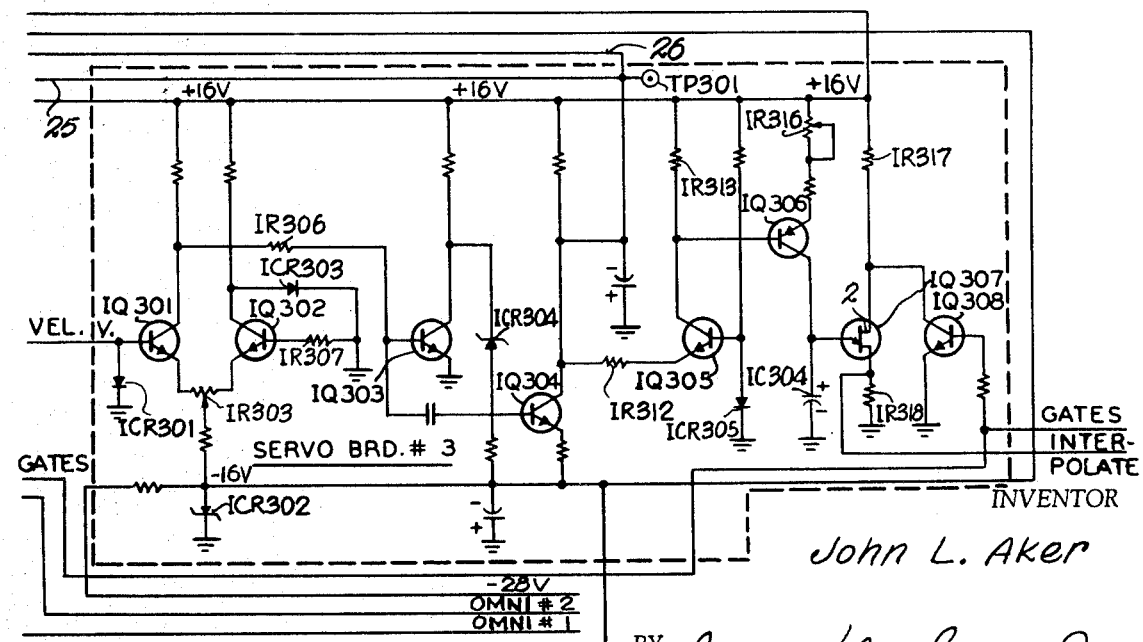
Fig. 5.

United States Patent Office 3,533,060
Patented Oct. 6, 1970

3,533,060
INDICATOR FOR DISTANCE MEASURING EQUIPMENT
John L. Aker, Olathe, Kans., assignor to King Radio Corporation, Inc., Olathe, Kans., a corporation of Kansas
Filed Aug. 25, 1966, Ser. No. 575,161
Int. Cl. G01c 23/00
U.S. Cl. 340—27                                13 Claims

ABSTRACT OF THE DISCLOSURE

An Indicator for use with Distance Measuring Equipment (DME) is operable to alternately display distance or time-to-station information. The Indicator produces a voltage that is proportional to the distance information from the DME and produces a second voltage which is proportional to the velocity of the aircraft utilizing same relative to the ground station from which the distance information was derived. These two voltages are then combined by a servo system and readout to alternately display either distance or time-to-station information.

---

This invention is designed to be used in conjunction with the DME (Distance Measuring Equipment) disclosed in my copending patent application, now Pat. No. 3,412,400, issued Nov. 19, 1968, and entitled "Method and Apparatus for Digitally Measuring Distance."

An object of the invention is to provide a highly efficient, low cost Indicator that is light weight and requires a minimum of component parts and cubic inch installation area.

Another object of the invention is to provide an unique Indicator that is capable of indicating distance, velocity and the time-to-station in a single unit.

Another object of the invention is to provide an uniquely arranged and controlled single set of counter readout wheels that displays both velocity and time-to-station depending on the type information desired.

A further object of the invention is to provide an automatic velocity and/or time-to-station computer designed for use with Distance Measuring Equipment (DME).

A still further object of the invention is to provide an unique means for supplying interpolation pulses to a DME for use in the event of a momentary loss of ground station Returns.

A particularly important object of the invention is to provide an Indicator, of the character described, which is conveniently adaptable for use with my DME unit disclosed in my copending application, mentioned supra.

Another object of the invention is to provide an unique Precision Block Generator that has significant utility both as an independent circuit development and in conjunction with Indicators of the character described.

Another object of the invention is to provide a Precision Block Generator of the character described that has wide temperature range stability.

Another object of the invention is to provide a Precision Block Generator that includes a voltage regulator in combination with a binary circuit.

A further object of the invention is to provide an unique Precision Block Generator including a voltage regulator binary arrangement in combination with a unijunction time base circuit which is operating off the regulator voltage output.

Another object of the invention is to provide a more accurate precision control for a unijunction relaxation oscillator.

Another object of the invention is to provide a unijunction relaxation oscillator circuit that eliminates the use of the inconstant parameter "valley voltage" for discharging a capacitor and determines the duration of the voltage block by the RC time constant and the standoff ratio of the unijunction.

A further object of the invention is to provide, both in an Indicator and as a separate concept usable independently, an unique current mode digital to analog converter which simplies the conversion process and reduces the number of circuit components required for velocity and time-to-station readout.

A still further object of the invention is to provide an unique square wave generator, having utility both with the Indicator per se and independently, said unique generator including the combination of a boot strap circuit and a unijunction oscillator.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views;

FIG. 1 is a frontal view of the Indicator unit as would be seen by the pilot during operation of the aircraft, said view including an upper window for displaying only distance, a lower window for displaying both velocity and time-to-station and two switches;

FIG. 3 is a schematic diagram showing Servo Board #1 and #5;

FIG. 4 is a schematic diagram of Servo Board #2 and a portion of Servo Board #4;

FIG. 5 is a schematic diagram of Servo Board #3 and a portion of Servo Board #4;

FIG. 6 shows the over-all arrangement and interconnection of FIGS. 3 through 5.

Figure 2:
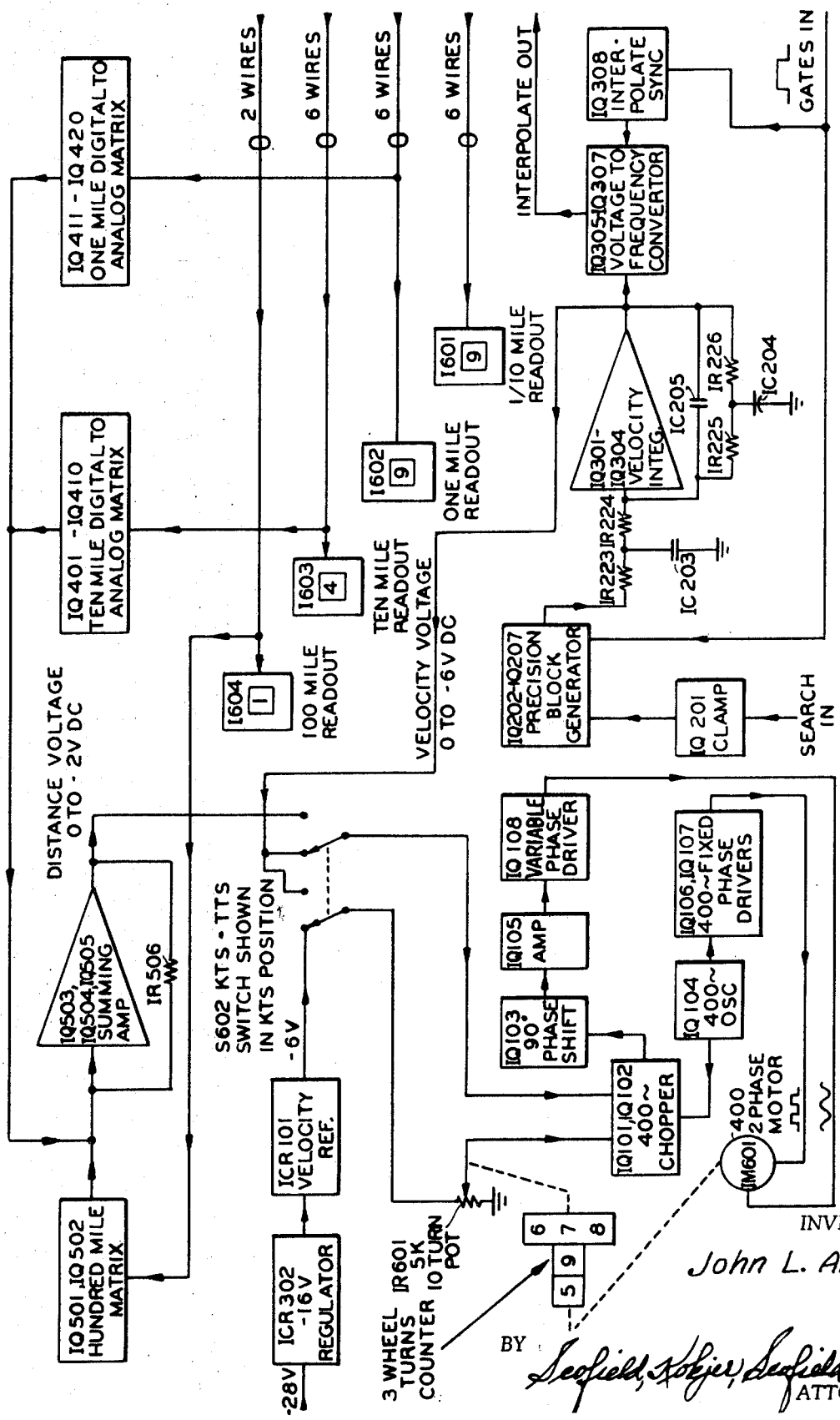
FIG. 2 is an over-all block diagram of the Indicator.

In the description the following prefixes aid in the identification of the various circuit components; (1) IQ—Transistors; (2) IC—Capacitors; (3) ICR—Diodes; (4) IR—Resistors or resistive components such as potentiometers.

One of the functions of the Indicator is to present the distance from aircraft to ground station on a series of readouts, as computed by the DME disclosed in my copending application now Pat. No. 3,412,400, supra. The Indicator also derives additional information from the DME in order to display a relative speed (KTS) of the aircraft with respect to the ground station and a time to that station (TTS) which is based on the presented distance and the relative computed speed.

There are four distance readouts across the upper window as seen in FIG. 1, same being actuated by the DME unit to display distance to the nearest tenth mile. The left-hand readout displays a warning flag when the unit is turned off or when the system is not presenting valid information, as during search or while in standby.

A 3-position switch, S601 (see FIGS. 1 and 3) in the left-hand corner of the Indicator panel selects either of two omni-receiver frequency controls to channel the DME. With the switch in the middle position, the DME remains tuned to the last selected DME ground station. This feature allows both omni-receivers to be tuned to frequencies not related to the desired DME ground station.

The KTS-TTS switch, S602 (see FIGS. 1 and 3) in the lower right-hand corner of the Indicator front panel, controls the function of the servo-driven counter wheels in the lower window. With S602 in the KTS position (left-hand position), relative velocities of zero to 599 knots may be displayed. With switch S602 switched to the TTS position, time to station in minutes is displayed. This information is derived from both distance and relative velocity and the maximum time display is 59 minutes.

During the search mode of operation, the DME unit will have driven the distance readouts, and their associated counters, to a 0–0–0 distance indication due to the pulse appearing on the Memory Reset Line. This driving of the readouts to the 0–0–0 state occurs at the onset of the search condition while the Video section goes through its search process, same being fully described in a discussion of the DME unit. The encoding of the digital information by the DME unit is oriented toward a Patwin five-coil readout. Various other types of readouts may be used but the type manufactured by the Patwin Electronic Company, a division of the Patent Button Company of Waterbury, Conn., and identified by their Model 15021 has proven to be particularly satisfactory. The Patwin readouts are of the type utilizing a drum rotating on a jewel bearing and having a permanent magnet attached to it. Surrounding this permanent magnet is a set of five coils which may be energized in one or two directions thereby giving a possibility of ten magnetic combinations as conventionally operated.

Consider the situation where the DME has gone from the search to the track mode at a distance of 150.0 nautical miles from the ground station. This results in a "1" being displayed on the 100-mile readout, a "5" displayed on the 10-mile readout and a "0" displayed on both the one and tenth mile readout. By referring to the drive coding requirement chart as shown on page 41 of my copending application, a positive 6-volt potential would be applied to the common wire "E" of the readout in consideration and a ground condition would be available back through coil "A" in order to display a "5" on the 10-mile readout wheel. This condition would cause a permanent magnet to become oriented in such a fashion with respect to the coils that a number "5" was presented to the window.

It should be noted there are several important inputs from the DME unit, namely the 6-wire inputs for the 1/10 mile readout I601, the One Mile readout I602, the Ten Mile readout I603 and the 2-wire input for the Hundred Mile readout I604 (see FIGS. 2–5). There are also inputs to the Indicator from the DME unit to the Search In line coming from the Initiation Board (Search Track binary) and the Gates line coming from the Gates Board (see FIG. 5).

The Indicator circuitry per se, can be conveniently separated and identified as Servo Boards #1, #2, #3, #4 and #5 shown as being within the broken line rectangles in FIGS. 3–5. These Servo Boards function in a cooperative manner to develop signals from the DME unit in order to display the information on the Servo-operated KTS-TTS Indicator.

Servo Board #1 is primarily concerned with the driving of a turns counter and a potentiometer IR601 in such a fashion so as to display a number that is proportional to the voltage presented to that board, said voltage being derived in the other Servo Boards. This number would be indicative of either speed (in a range from zero to 599 knots) or in time (from zero to 59 minutes).

Servo Board #2 contains a Precision Block Generator (IQ202–IQ207) and part of the feedback circuitry for a high gain operational amplifier located on Servo Board #3. The Precision Block Generator is designed to be triggered once for each tenth mile distance change as is signified by a pulse on the Gates line coming from the DME unit. The output of this Block Generator is presented to an Integrator (IQ301–IQ304) which over a period of several minutes generates a voltage which is a function of the average rate of change of distance over that period of time.

Servo Board #3 contains a high gain DC differential amplifier used in conjunction with the feedback network on Servo Board #2, mentioned above, to perform the integration function. Servo Board #3 also contains a voltage to frequency converter (IQ305–IQ307) which functions to generate a pulse rate proportional to the velocity voltage as produced by the Integrator-Precision Block Generator combination. This pulse rate, as generated by the voltage to frequency converter, is used for the interpolation function in the event of complete loss of returns to the DME unit as mentioned in the copending application. This pulse rate changes the indicated distance in a manner so that the distance readout change appears continuous to the pilot even though the signal has been momentarily lost.

Servo Board #4 contains two Digital to Analog matrix systems. The purpose of these systems is to generate a current (delivered to a Sum Node Bus discussed later) that is proportional to the distances indicated by the one and ten mile readouts. The 1/10 mile readout is neglected for the purpose of time, due to the practicality of utilizing such information.

The Servo Board #5 contains a 100 mile matrix which exists in a degenerate fashion since the only information is with a "0" or a "1" being presented on the 100 mile readout. Additionally, Servo Board #5 contains an operational amplifier for summing the various currents generated by the matrices.

Referring to FIG. 3, the component makeup of Servo Board #1 includes two amplifiers that produce AC output voltages of proper phase and amplitude to operate a two-phase AC motor IM601. Two negative DC voltage signal inputs are required for operation. The first of the two inputs is derived from the wiper arm of the ten turn precision potentiometer IR601, rotated through its range by motor IM601 through suitable reduction gearing. Since the system is a null-seeking one, a negative voltage applied to the second signal terminal input will cause an output voltage to be applied to the variable phase winding of motor IM601. Potentiometer IR601 will then effectively be rotated by motor IM601 in the proper direction so that the voltage on its wiper arm approaches the voltage at the second signal input terminal. When the two input voltages are equal, the variable phase voltage developed by a servo amplifier reduces to zero and motor IM601 stops. IM601 is also geared to the turn-counter dials in the lower window on the Indicator's face (see FIG. 2) that will present any number between zero and 599. Thus, the number presented by the counter dials is directly related to the position of potentiometer IR601's wiper arm which in turn depends on the voltage applied to the second input terminals. This system may be thought of as a digital voltmeter with a reference voltage applied to the ungrounded end of potentiometer IR601 and a voltage to be measured applied to the signal input terminal.

AC voltage wave forms required by the servo amplifier are initiated by IQ104, a unijunction oscillator, whose nominal frequency is 400 cycles. At initial turn-on the anode of diode ICR102 will be approximately 1.4 volts positive with respect to ground, equivalent to the forward biased voltage drop of diode ICR102 and the base emitter junction IQ107. As capacitor IC106 charges toword plus 16 volts, current through IQ107's base increases, driving it into saturation. When capacitor IC106 charges to a critical voltage, approximately plus 10 volts, the resistance between the emitter and base 2 of IQ104 suddenly drops from a very high to a very low value. The positively charged side of capacitor IC106 is thereby brought to ground, so that its negatively charged side now back-biased diode ICR102 and base drive is removed from IQ107. Capacitor IC106 continues to discharge until the negative side becomes slightly positive (approximately 1.4 volt as indicated above) at which time diode ICR102 and IQ102 again become conducting and the oscillator repeats the cycle.

Leads 20 and 23 of the fixed phase winding motor IM601 are connected to the plus 16-volt supply bus. The other lead (lead 21) connects to IQ106's emitter and IQ107's collector through capacitor IC109. IQ106 and IQ107 comprise a "boot strap" amplifier. When IQ107's base is driven positive, its collector to emitter resistance drops to a low value. Since the emitter of IQ107 is grounded, the emitter and the base of IQ106 will also approach ground potential at this time. IQ106 is an emitter follower, with its emitter to ground voltage following changes in the base to ground voltage. With base drive removed from IQ107, its collector to emitter voltage becomes high and IQ106's emitter follows, with its voltage approaching plus 16 volts. Therefore, when capacitor IC106, in the unijunction oscillator circuit is charging, the end of the fixed phase winding connected to capacitor IC109 is brought toward ground. When capacitor IC106 is discharging, the negative side of capacitor IC109 approaches plus 16 volts, producing a voltage peak across the fixed phase winding. The effects produce a nearly rectangular wave form across the fixed phase winding of motor IM601 with a peak to peak voltage of almost 16 volts with a frequency of approximately 400 c.p.s.

The speed and direction of motor IM601's rotation depends on the amplitude and the phase of voltage applied to the variable phase winding. Maximum torque is developed by motor IM601 for a given variable phase voltage when the phase difference between fixed and variable windings is exactly 90°.

IQ103, IQ105 and IQ108 comprise a variable phase drive amplifier. IQ101 and IQ102 are Chopper transistors, so called because of the function they perform. A 400-cycle wave form from IQ104 is applied between the bases and collectors of IQ101 and IQ102 through transformer IT101. When the base of either of these transistors (IQ101 or IQ102) is made positive with respect to its collector, a negative voltage present on its emitter will also be present at the collector. When the voltages on the emitters of IQ101 and IQ102 are other than equal, the resultant wave form at the emitter to IQ103 is a square wave with a voltage equal to the difference of the two emitter inputs and of the same frequency as that produced by unijunction IQ104.

IQ103 is a phase shifting amplifier. A feedback network between the collector and the base of IQ103, consisting of capacitors IC104 and IC105 and resistor IR107 produces a 90° phase shift between input and output wave forms of IQ103. Actually, this network is frequency conscious so phase shift will be 90° only if the unijunction 400-cycle oscillator IQ104 is on the proper frequency. IQ103's input wave form is a square wave and its output has a sine wave. IQ105 and IQ108 amplify the sine wave output of IQ103 and apply it to the variable phase winding of motor IM601 via lead 22 with little further phase shift. While the fixed phase winding of motor IM601 is DC blocked by capacitor IC109, the collector current of IQ108 flows through the variable phase winding. This DC component in the variable phase winding creates damping which prevents excessive high speeds that could cause damage at either rotation limit of potentiometer IR601.

When the voltage at the emitter of Chopper transistor IQ101 is higher than the voltage at IQ102's emitter from the wiper arm of the potentiometer IR601, the phase of motor IM601's variable phase winding will be such that IM601 will rotate in the direction that causes potentiometer IR601's wiper arm to present an increasing voltage to IQ102's emitter. As the voltage at potentiometer IR601's wiper arm approaches the voltage of IQ101's emitter, the Chopper output to IQ103 will become less, resulting in less variable phase excitation and slower speed of motor IM601. When potentiometer IR601's wiper arm voltage presented to IQ102's emitter finally equals IQ101's emitter voltage, the collector voltage of each transistor will be equal at the time these choppers are alternatively driven into conduction by transformer IT101's secondary wave form. This condition results in a loss of square wave input to IQ103, therefore no variable phase drive and motor IM601 stops.

If IQ101's' emitter voltage now becomes less than the voltage at potentiometer IR601's wiper arm, the variable phase drive voltage will change by 180° from the above mentioned situation. A 90° phase difference, now of the opposite sense, is maintained with respect to the fixed wave form. This will cause motor IM601 to change potentiometer IR601's setting until a null condition is again reached, now at a lower point on potentiometer IR601. Since the counters in the lower windows are geared to motor IM601 and potentiometer IR601 (see FIG. 2), they will now read a lower number than previously discussed.

Returning now to a more detailed discussion of Servo Board #1, for the purposes of illustration, assume that the DME unit is tracking inbound from a position 150 nautical miles away from the ground station at a 300 knot rate (nautical m.p.h.). Assume, also, that the knots (speed indication selection KTS) has been made by the pilot, which in this case would entail moving switch S602 to the KTS position. The moving of switch S602 to the KTS position connects a minus 6-volt reference voltage on the ten turn potentiometer IR601. If the aircraft is 150 nautical miles away and travelling at a velocity of 300 knots, the emitter of Chopper transistor IQ101 would be connected to the velocity voltage which will be a −3 volts. The computation and circuitry for the derivation of the −3 volts will be explained later; however, at this time we will assume that the −3 volts correlates to a velocity of 300 nautical miles per hour. A comparison will then be made between the potentiometer IR601 wiper and the unknown velocity voltage by the Chopper transistors IQ101 and IQ102 which are alternatively being driven into conduction by the 400-cycle unijunction IQ101 as explained above. The center tap of transformer IT101, will alternately be at the potential at the wiper arm and then at the potential of the velocity voltage (in this instance a −3 volt). If a potential difference exists, e.g. if a wiper arm is not also at a −3 volts, then an alternating voltage will be seen at capacitor IC103 and transferred through IC103 to the base of IQ103. IQ103 will amplify this AC voltage and shift into phase by approximately 90°. This voltage will, then, be further amplified by IQ105 and IQ108 as noted above in the discussion of the Variable Phase Driver. This shift in phase is due to the requirement of the two-phase 400-cycle motor which requires two 400-cycle drive voltages 90° apart in phase difference to rotate. The other phase of the motor is, of course, being continually driven at a fixed phase and amplitude by the fixed phase drivers IQ106 and IQ107. Thusly, motor IM601 is energized with the fixed reference voltage continuously applied and a variable voltage whose amplitude is variable and whose phase either may be leading or lagging by 90° from the reference phase. The motor then rotates in one direction or the other depending on whether the phase of the variable drive is leading or lagging and said rotation is at a rate proportional to the amplitude of the variable voltage.

Accordingly, Servo Board #1 is operable due to the Chopper transistors and the nature of the phase rotation of the motor, to cause the ten turn potentiometer to be driven in such a fashion that the wiper arm voltage is always equal to the voltage on the emitter of IQ101 and thereby stopping the rotation of the motor when this voltage is reached. A suitable mechanical linkage, including gear reductions, to the three-wheel turns counter represents the position of the wiper arm on potentiometer IR601 from zero to 599 as the potentiometer goes from one end of its travel to the other.

In the discussion of Servo Board #1, a −3 volt velocity voltage was assumed, and now by referring to Servo Board #2, shown in FIG. 4, it will be seen how this −3 volt velocity voltage (or any other representative velocity voltage) was generated as a result of the 300 knot rate of change.

The ranging circuitry in the DME unit is digital, however the velocity readout is an analog system. A conversion of the digital velocity information to an analog form is accomplished by Servo Board #2. Each change in the 1/10 mile readout provides an input to Servo Board

2 from either the Add or Subtract binaries on the Gate board in the DME unit, depending on whether the aircraft in inbound or outbound from the DME ground station. Every pulse from the Gate board causes Servo Board #2 to generate a voltage block, precisely controlled in both amplitude and time of duration. These precision pulses are integrated by a long time constant network to produce a DC voltage whose amplitude is directly related to the relative velocity between the aircraft and the DME ground station. This voltage, amplified by Servo Board #3, as will be discussed, and presented to Servo Board #1, determines the number readout on the KTS counter. It is also used as one of two variable inputs to Servo Board #1 when time-to-station (TTS) information is displayed.

As mentioned above, assuming an inbound travel at a 300 knot rate, the Subtract binary on the Gates board in the DME unit (my copending application now Pat. No. 3,412,400 supra would be triggered periodically each time a 1/10 mile distance change is commanded by the Subtract Integrator. This will result in a short positive pulse on the Gates line being available to the Indicator via that line. Note that the Gates line goes both to Servo Board #2 and Servo Board #3.

The pulse on the Gates line to Servo Board #2 is presented to the Precision Block Generator at an average rate of one pulse every 6/5 of a second if the corresponding velocity is 300 knots.

Three interrelated circuit functions produce a voltage block for each 1/10 mile of indicated change of distance. These circuits are a Pulse Width Generator (IQ202, IQ203), Voltage Regultaor (IQ204, IQ205), and a Velocity flip-flop (IQ206 and IQ207).

IQ206 and IQ207 form the Velocity flip-flop with IQ206 normally conducting and IQ207 normally cut off. A positive pulse on the Gates line from Gate board applied to the base of IQ207 through resistor IR219 drives it into conduction, which in turn removes the base drive through resistor IR216 to IQ206, causing IQ206's collector voltage to rise. IQ207's base now receives drive through resistor IR215, maintaining IQ207's state of conduction.

IQ204 is an emitter follower used as a series voltage regulator to precisely control the voltage applied to the unijunction IQ202 and at TP201. With IQ206 in its previous state of conduction, IQ204's base was grounded and no voltage was available to IQ202 from IQ204's emitter circuit. Now, with IQ206 nonconducting, base current is available to IQ204 through resistor IR213, allowing conduction through IQ204.

IQ205 is a special reference amplifier that controls the voltage available at IQ204's emitter by controlling IQ204's base current. IQ205 has a Zener diode built into its case, providing a voltage reference for IQ205's emitter. This device is constructed to provide stable control of IQ204's emitter voltage over wide temperature ranges. Resistors IR211 and IR212 in the base circuit of IQ205 are resistors whose temperature coefficient is well matched over wide temperature variations. Any tendency for IQ204's emitter voltage to rise results in increased base drive to IQ205. IQ205 therefore draws more collector current through resistor IR213, resulting in a lowered voltage at IQ204's base and a return of IQ204's emitter voltage to the desired value. Likewise, if IQ204's emitter voltage drops, IQ205's base will be less, IQ205 will draw less current through resistor IR213 and more current will flow through IQ204's base to return IQ204's emitter voltage to the desired value. The voltage at IQ204's emitter will be approximately +14 volts. The absolute value of this voltage is not as important as its stability over a wide temperature range.

Unijunction IQ202 forms a relaxation circuit whose time constant is determined by capacitor IC202, resistor IR208 and the setting of potentiometer IR209. When IQ206, in the Velocity flip-flop, is made non-conductive by the positive pulse on the Gates line from the Gates board to IQ207, IQ204's emitter voltage begins to charge capacitor IC202 through resistor IR208 and resistor IR209. When the voltage applied to IQ202's emitter rises to approximately six-tenths of the voltage of IQ204's emitter, the resistance between IQ202's emitter and base 1 drops sharply partially discharging capacitor IC202 through resistor IR206. The time required to charge capacitor IC202 to this critical point (about 150 milliseconds) may be varied over a narrow range by adjustment of the velocity calibration potentiometer IR209.

The positive voltage spike, developed across resistor IR206 when IQ202 conducts, is fed to the base of IQ206 through resistor IR217. IQ206 conducts with its collector voltage dropping to nearly zero. Base drive to IQ207 through resistor IR215 is removed and IQ207's collector voltage rises, maintaining IQ206 in a conducting state with base drive through resistor IR216. IQ204's base is also brought to ground resulting in zero voltage at its emitter.

IQ202 does not completely discharge capacitor IC202, however it is desirable to have each charging cycle of capacitor IC202 take the same length of time. Since IQ207 is non-conducting at this time, IQ203's base is driven through resistor IR220. IQ203, through resistor IR207 in its collector circuit, rapidly completes the discharge of capacitor IC202 to ground. This insures that every Gate pulse, regardless of its spacing, starts charging capacitor IC202 from zero volts and relieves unjunction IQ202 from the responsibility of discharging capacitor IC202.

Conventional unijunction relaxation oscillator circuits use the "valley voltage" as part of the circuit operation. The term "valley voltage" being that value of voltage at which the unijunction, once triggered, will discharge a capacitor before it turns off again. In the above embodiment it is noted that IQ203 discharges capacitor IC202 to essentially ground potential so that the valley voltage (a relatively inconstant parameter) is not involved in the timing of the circuit. Only the peak point voltage is significant as unijunction IQ202 with its base operating off the TP201 block voltage, maintains the peak point voltage at a constant value until the voltage on IC202 reaches the peak or trigger voltage of IQ202. When the firing of IQ202 occurs, capacitor IC202 discharges into resistor IR206, causing a positive voltage to appear between resistor IR206 and ground. This voltage causes IQ206 to be turned on due to current flow through resistor IR217, thereby resetting the binary (IR206 and IR207). Thus, the duration of the voltage block has been determined by the RC time constant of resistor IR208 and capacitor IC202 and the standoff ratio of unijunction IQ202.

The above discussion outlined the following sequence of events: When in the track mode, every 1/10 mile change in the digital ranging readout introduces a starting pulse to Servo Board #2. This pulse immediately causes a regulated voltage to appear at the emitter of IQ204. A short time later, unijunction IQ202 causes the regulator voltage to cease, and the circuits will await the next Gate board 1/10 mile initiating pulse.

A long time constant, low pass integrating filter network consisting of resistor IR233, capacitor IC203 and resistor IR224 is charged by the regulated voltage at IQ204's emitter during the time intervals it is present. The network's time constant is of such a length that many 1/10 mile crossings are required to arrive at a stable value of charge on capacitor IC203. It may be seen that a higher velocity, with more 1/10 mile crossings in any given period of time, will result in a higher net voltage at the output of the filter network. This output is the Velocity voltage information supplied to Servo Board #3.

The operational amplifier on Servo Board #3 receives its input from the integrating output circuit on Servo Board #2. A feedback network, consisting of resistors IR225 and IR226 and capacitors IC204 and IC205 applies a portion of the operational amplifier's output to its input as negative feedback.

The gain of the operational amplifier on Servo Board #3 would be quite high, around 5,000, if no feedback was applied. The effective gain is reduced to a low, stable, value by large negative feedback. The ratio of the average DC level from the Precision Block Generator to the output of voltage from the operational amplifier on the Servo Board #3 is determined by the resistance values in the feedback network.

While the operational amplifier's output follows changes in the average DC level to the filter network at its input, negative feedback maintains the voltage at the base of IQ301 near zero with respect to ground.

During the first part of the track mode of the DME unit, input pulses may be applied to Servo Board #2 from the Gate board that are meaningless in terms of velocity. IQ201 functions as a Clamp about the first 15 seconds of track to hold IQ206 in a conducting state. This insures that the Velocity flip-flop is triggered only by Gate board pulses that are due to actual changes in distance.

Also during search, diodes ICR202 and ICR203 are back-biased by a positive voltage from the Search-Track binary on the Initiation board in the DME unit. IQ201 receives base drive through resistor IR202 and diode ICR201. With base drive, IQ201 conducts so that no base drive is available to IQ206 through resistor IR204. The anode of diode ICR201 will be held at about 1.2 volts positive due to the base-emitter gap of IQ201 and the forward drop in diode ICR201. Capacitor IC201 will therefore charge to about +14 volts through resistor IR201.

When the unit goes into track, the cathode of diode ICR203 is grounded by the Search-Track binary in the DME unit. The positively charged side of capacitor IC201 is brought near ground and the negatively charged side of the capacitor IC201 back-biases diode ICR201, removing base drive from IQ201. With base drive removed, IQ201 no longer conducts. Base drive to IQ206 through resistors IR204 and IR218 maintains IQ206 in a state of conduction. Gate pulses to the base of IQ207 cannot change the state of the Velocity flip-flop while this conduction exists.

After about 15 seconds, capacitor IC201 will be discharged through resistor IR202. The back-bias is removed from diode ICR201 and IQ201 returns to a state of conduction. Excess base drive to IQ206 is removed and the Velocity flip-flop may function normally. Diodes ICR202 and ICR203 provide a voltage drop so that capacitor IC201, a polarized capacitor, is not charged in the reverse direction to track mode.

Having developed a constant amplitude block voltage pulse in Servo Board #2, whose repetition rate has a one-to-one relationship with the tenth mile rate of change, if an integration function is performed (in order to take the DC average of the output of the system over a number of tenth mile changes), then the DC average will represent the rate of tenth mile changes that the aircraft is making with respect to the ground station. This integration function is performed, in part, by Servo Board #3. In addition to a Velocity Integrator, Servo Board #3 includes a Voltage-to-Frequency Converter and an Interpolate Synchronization circuit.

The primary function of the Velocity Integrator (IQ301–IQ304) is to sample and to integrate the output voltage of the Precision Block Generator (output at TP201), and convert it into a highly stable velocity reference voltage. This voltage is used by Servo Board #1 for both the velocity and the time-to-station readout. It is also used by the Voltage-to-Frequency Converter.

The Velocity Integrator consists of the operational amplifier IQ301 through IQ304 (see FIGS. 2 and 5), with the integrating prefilter network resistor IR223, capacitor IC203 and resistor IR224, and the feedback network which includes resistors IR225 and IR226, and capacitors IC204 and IC205. Note that although these two networks are an integral part of the Velocity Integrator, they are physically in the circuit referred to on Servo Board #2, however their operation may be conveniently discussed with Servo Board #3.

The operational amplifier IQ301–IQ304 can be subdivided into a differential amplifier IQ301 and IQ302, and a DC amplifier IQ303 and IQ304.

The differential amplifier IQ301 and IQ302 is used to compare the sampled velocity input with that of a reference voltage. An error voltage is obtained when an unbalanced condition exists.

Under normal (or balanced) conditions, IQ302's base is referenced to ground potential through the base return resistor IR307. The clamping diode ICR303 clamps the collector of IQ302 to the diode gap voltage above ground (approximately +0.6 volt).

IQ301 receives the prefiltered velocity information from the Precision Block Generator located on Servo Board #2. As mentioned above, the average amplitude of this voltage is proportional to velocity. Error voltage is obtained from the collector of IQ301, same becoming less positive as the error increases. The clamping diode ICR301 clamps the base of IQ301 to its gap voltage above ground, eliminating the possibility of amplifier latch-up.

The DC amplifier, IQ303 and IQ304, provides additional gain as well as a voltage reference shift. Any error voltage that is the direct result of a velocity change is developed on the collector of IQ301, and is resistively coupled to the DC amplifier input IQ303 by resistor IR306. If the error is due to increased velocity, the base drive of IQ303 drops and its collector goes more positive. If the error is due to decreased velocity, the base drive of IQ303 increases and its collector voltage becomes less positive.

The collector of IQ303 is coupled to the base of IQ304 through the 16 v. Zener diode ICR304. This allows the base drive of IQ304 to follow directly the changes occurring at the collector of IQ303 with the addition of a 16 v. less positive reference level provided by the Zener. Therefore, the collector voltage of IQ304 will become more negative with an increase in velocity and become less negative with the corresponding decrease in velocity.

The feedback network around the operational amplifier stabilizes the input voltage (the voltage to the base of IQ301), to zero volts under balanced conditions. Any change in the velocity voltage results in a corresponding change in the collector voltage of IQ304. Thus, the collector voltage of IQ304 is the velocity output. Both the operational amplifier's feedback and the velocity output voltage used by Servo Board #1 are taken from this point (TP301). This voltage is also used as a velocity reference for the Voltage-to-Frequency Converter (IQ305–IQ307) described infra.

A velocity zero potentiometer IR303 is provided to eliminate any offset voltages introduced by circuit parameters and may be adjusted to obtain zero voltage output at the IQ304 collector output reference when the input velocity is equal to zero KTS. Once adjusted, the output voltage will vary from zero to minus 6.0 volts, being directly proportional to an input velocity from zero to 600 KTS.

To follow the block generation through the integrator to a DC output, note that at TP201, the block voltage exists and is applied to resistor IR223. Capacitor IC203 somewhat filters this block voltage, removing some of the AC components of the block output. Current flows on through resistor IR224 to the input of the operational amplifier (the base of IQ301). Also connected to the base of IQ301 is the feedback network (previously mentioned) that exists via line 25 from the collector of IQ304 (TP301).

The output of the operational amplifier will ultimately reach a negative value such that the current through resistors IR225 and IR226 equals the current being supplied through resistors IR223 and IR224 from the Block Generator. This condition represents the steady state of the system and a negative voltage will, of course, be present at TP301. When used in the speed (velocity) display mode (switch S602 in the KTS position), this negative speed voltage is applied back to the emitter of IQ101 via line 26 and through switch S602. This voltage is then compared with the voltage on the wiper arm of potentiometer IR601 resulting in Servo Board #1 causing a movement of the potentiometer wiper arm so that there is "no" or "zero" voltage difference existing between the velocity voltage and the potentiometer arm as discussed with reference to Servo Board #1, supra.

The primary function of the Voltage-to-Frequency Converter is to provide an output pulse whose repetition rate is a direct function of the indicated velocity. These output pulses, which are continuously being generated, are fed to the Gate board in the Video section of the DME unit. They are used to provide an uninterrupted tracking operation of the DME during a temporary loss of the ground station Returns. (Discussed in my copending application, supra.)

The Voltage-to-Frequency Converter consists of the DC level shift transistor IQ305, the Constant Current Generator IQ306, and the unijunction relaxation oscillator IQ307 (see FIGS. 2 and 5).

The DC Level Shift Network consists of transistor IQ305 which is made to operate in a common base mode by the base clamping diode ICR305. The common-base alpha of the transistors approaches unity, therefore the collector current is approximately equal to the emitter current. Since the emitter of IQ305 ties to the velocity reference point on the collector of IQ304 through the emitter resistor IR312, the emitter current of IQ305 is a direct function of the voltage of IQ304. The voltage drop across the collector resistor IR313 becomes a function of velocity. Thus, the voltage at the collector (IQ305) becomes less positive as the velocity increases, and more positive as the velocity decreases.

If the velocity goes to zero, IQ305 approaches cutoff, since the base bias (obtained from the gap voltage of diode ICR305) is not sufficient to overcome the base to emitter gap voltage of IQ305. Thus, under zero velocity, the collector of IQ305 approaches the line voltage (+16 v.). Accordingly, the collector voltage at IQ305 varies inversely with velocity, approaching line voltage when the velocity approaches zero. IQ305, then, serves as a level translator so that the voltage on the collector of IQ305 varies below the 16 v. level by the same voltage that the operational amplifier varies below ground potential.

IQ306 is a Constant Current Generator whose collector current becomes proportional to the translated level present at resistor IR313. In other words, the larger voltage drop across resistor IR313, the more current required by IQ306 to maintain that voltage across its emitter resistor. Therefore, the conduction level of IQ306 is a direct function of velocity, increasing as the velocity increases. This conduction level, a function of velocity, is used to control the charging rate of capacitor IC304, which in turn controls the frequency of the unijunction oscillator IQ307.

The unijunction relaxation oscillator (IQ307) generates the Interpolate pulse as indicated above. To more fully understand the oscillator, consider first the basic unijunction characteristics. With a positive interbase voltage applied to the unijunction through the resistive network IR317 and IR318, the emitter will be reverse biased. It remains in that state until the voltage at the emitter becomes more positive than the peak point voltage, at which time capacitor IC304 discharges through resistor IR318. The emitter again becomes reverse biased and the cycle repeats itself.

Since capacitor IC304 is charged from a Constant Current source (Constant Current Generator IQ306), the voltage developed across it is a ramp function whose slope is determined by the magnitude of the charging current. As shown above, this charging current is a function of velocity. The Interpolate Calibrate adjust potentiometer IR316 is used as a fine frequency adjustment by compensating for circuit parameter variations.

The voltage developed across resistor IR318 during the discharge of capacitor IC304 is the Interpolate pulse which is fed back to the Video section (Gate Board) via the Interpolate line where it can be used for the interpolate function by the DME if conditions so demand.

The purpose of IQ308 is to synchronize the action of unijunction IQ307 in such a fashion that the pulse rate of IQ307 is in phase with the pulse rate from the Gate line. The effect of this is that each Interpolate pulse is starting in constant phase relationship or from the last known tenth mile distance change.

Synchronization of the Interpolate Out pulse is accomplished by referencing the start of the capacitor IC304 charge cycle with the termination point of the Gate pulse. When a positively going Gate pulse is coupled to the base of IQ308, the transistor becomes saturated, effectively placing base 2 of unijuction IQ307 at ground potential. This provides a low impedance discharge path for capacitor IC304, maintaining it in a fully discharge condition until the Gate pulse is removed. At this point, the next charge cycle will begin.

Since the charge cycle is always synchronized to the last Gate pulse, the Interpolate pulse (produced at the end of a respective charge cycle) will occur at approximately the same rate that the next Gate pulse is due if the aircraft is maintaining a constant velocity. This continuity of pulse occurrence between the two pulses will allow the Interpolate pulse to be substituted for any missing distance change pulses (tenth mile distance changes) in the event of a momentary loss of ground station Returns. Note the discussion in my copending application regarding the Interpolation function.

Servo Boards #4 and #5 are concerned with the generation of a suitable distance voltage which is proportional to the digital information on the various distance readouts. This distance voltage (necessary in analog form) is required for the generation of the time function as will be discussed. In order to produce a time-to-station display, a process of division is necessary due to the fact that time is proportional to distance and inversely proportional to speed. To perform this non-linear operation of division, the potentiometer system is particularly useful in that it is a product function. As noted with the discussion relative to Servo Board #1, the voltage at the wiper arm of the potentiometer (IR601) is proportional to the product of the wiper arm position and the voltage presented to the potentiometer winding. This gives the multiplication product or function that is needed to perform what might be called an implicit division.

This division process is performed by placing the speed voltage on the ungrounded end of the potentiometer winding and by placing a distance voltage at the Chopper input to be compared with the wiper arm position. The Servo Board will seek the null condition and when it has reached this null condition, the wiper arm will indicate a setting that would be proportional to the distance and inversely proportional to the speed voltage.

The generation of the distance voltage is produced by a current summing system at the input of an operational amplifier. The operational amplifier, IQ503, IQ504 and IQ505 will be discussed in more detail infra, however, at this point note that this amplifier has only moderate requirements for accuracy and a gain of about 200. The currents to be summed are generated by the one and ten mile matrices located on Servo Board #4 and also a hundred mile matrix IQ501 and IQ502 located on Servo Board #5. In principle, the matrices operate to decode the voltage conditions on each readout in such a way that a current is generated proportional to the number that should be displayed on the readout. The current is also proportional to the rank of the readout in distance in such a manner that if a "5" is shown on a ten-mile readout, it is ten times as significant (in current values) than a "5" shown on the one-mile readout.

Turning now more particularly to Servo Board #4, this Board consists of the two above mentioned matrices that develop out put currents which are a direct function of the indicated distance in nautical miles. The matrix output in conjunction with the operational amplifier located on Servo Board #5, provides a negative distance voltage to Servo Board #1 when time-to-station (TTS) is displayed. When a "1" is indicated by the left-hand readout for distance of a hundred miles or more, an additional matrix output on Servo Board #5 is generated. No matrix outputs are developed for tenth mile readout changes.

For the one and ten mile readouts, voltage applied to the readout coils are also used to control transistors that introduce different amounts of resistance between the plus 16 volts bus and the Sum Node bus. All even numbered transistors on Servo Board #4 (among transistors IQ401 through IQ420) have precision resistor networks between the +16 volt bus, their collectors, and the Sum Node bus such as the following with their resistive values shown in FIGS. 4 and 5:

IQ402—IR429, IR430
IQ404—IR431, IR432
IQ406  IR433, IR434
IQ408—IR435, IR436
IQ410—IR437, IR438
IQ412—IR439, IR440
IQ414—IR441, IR442
IQ416—IR443, IR444
IQ418—IR445, IR446
IQ420—IR447, IR448

The odd numbered transistors, whose bases and emitters are connected to readout coil lines, control base drive to an associated even numbered transistor. If a zero is indicated, all even numbered transistors associated with that readout are in saturation, which places all resistors between the Sum Node bus and those collectors in parallel to ground.

IQ420 in the one mile matrix, and IQ410 in the ten mile matrix are off for all indicated odd numbers. The following chart indicates transistors that are off for each indicated number of the one and ten mile readouts.

| Number indicated | Transistors off | |
|---|---|---|
| | 1 mile matrix | 10 mile matrix |
| 0 | All on | All on. |
| 1 | IQ420 | IQ410. |
| 2 | IQ418 | IQ408. |
| 3 | IQ418, IQ420 | IQ408, IQ410. |
| 4 | IQ416 | IQ406. |
| 5 | IQ416, IQ420 | IQ406, IQ410. |
| 6 | IQ414 | IQ404. |
| 7 | IQ414, IQ420 | IQ404, IQ410. |
| 8 | IQ412 | IQ402. |
| 9 | IQ412, IQ420 | IQ402, IQ410. |

The values of the precision resistors between the collectors of the transistors in the above chart and the Sum Node bus are such that a higher indicated distance readout number lowers the resistance between the +16 volt bus and the Sum Node bus. Since all charted transistors not off for a particular indicated number are in saturation, their precision resistors are in parallel from the Sum Node bus to ground. Therefore, the total current into the Sum Node bus from the one and the ten mile matrices is determined by the indicated distance. The magnitude of the current from each matrix is proportional to the displayed readout number. An examination of FIGS. 4 and 5 will indicate in values of circuit resistances that the current through resistors IR431 and IR432 when a six is read out is three times as large as the current through resistors IR435 and IR436 when a two is read out by the ten miles distance readout. Similarly, a "six current" from the ten mile matrix is ten times greater than a "six current" from the one mile matrix.

A more retailed examination of the matrices on Servo Board #4 indicates that a series combination is connected between the +16 volt bus line and the Sum Node bus. Taking for example, IQ420 in the one mile matrix, it can be seen that when IQ420 is off, current will be allowed to flow from the 16 volt line through resistors IR447 and IR448 to the Sum Node bus. This current, has a magnitude which is approximately equal to 16 volts divided by one megohm. For purposes of identification, this is a "one" (1) current since this condition of IQ420 being off would be produced whenever a one (1) was displayed on the one mile readout. IQ418 has a resistance in its collector of approximately one-half a megohm and therefore the current that would flow from the +16 volt bus to the Sum Node bus would be approximately twice that of the "one" (1) current or what may be called a "two" (2) current. (16 volts divided by one-half meg. is approximately twice 16 volts divided by one meg.). The diode ICR408 and resistor IR424 are connected in such a fashion to the readout terminals that whenever a "two" (2) is being driven on the one mile readout, IQ417 would be on and IQ418 would be off, thus allowing the "two" (2) current to flow.

As can be seen from FIGS. 4 and 5, the transistors are paired in such a fashion that one transistor performs the decoding and the other transistor performs the current switching function. Not IQ408 on the ten mile matrix. It can be seen that IQ408 has a collector resistance of nearly 50,000 ohms (a 5K resistor in series with a 45K resistor. Note also that this resistance is one-tenth that of the resistance of the collector of IQ418). This arrangement of resistive values indicates that a "twenty" (20) current will occur when IQ408 is off.

IQ401 through IQ410 is connected in exactly the same manner to the ten mile readout as IQ411 through IQ420 is connected to the one mile readout. The resistors in the collectors of the switching transistors are selected in such a fashion as to produce one, two, four, six and eight units. This causes some combining of currents to be done to display certain odd numbered current. For example, if a "nine" (9) were being displayed on the one mile readout I602, IQ412 would be off presenting an "eight" (8) current to the Sum Node bus and IQ420 would be off presenting a "one" (1) current to the Sum Node bus or a total of nine current units.

Turning to the chart on page 41, of my above mentioned copending patent application, the decoding under the "nine" (9) condition may be seen. Note that for a display of a "nine" (9) the voltage on the terminals of readout I602 would have a positive voltage on the common E and a ground condition on coil C. That chart also indicates that all odd numbered displays have a positive on the common E. This condition actuates the units (one) current source by turning on IQ419 whenever a positive voltage exists on the common E. With IQ419 being on, IQ420 will then be off allowing the unit current to flow into the Sum Node bus. The selection of an "eight" (8) current is then made due to the fact that coil C is at ground potential, allowing current to flow through diode ICR405.

Terminal F (and likewise coil F) will have an incidental positive voltage on it due to the fact that all coils will repeat the common voltage if not otherwise grounded by the matrix selection on the range board in the DME unit as indicated by the above-mentioned chart. With IQ411 on, IQ412 will be off allowing an "eight" (8) current to flow through resistors IR439, IR440 into the Sum Node bus. The total resistance in that instance being approximately 125K or ⅛ of the one meg. resistance.

The hundred mile matrix works in a similar fashion. This matrix comprises transistors IQ501 and IQ502. Note that whenever a "one" (1) is driven on the hundred mile readout, I604, a positive voltage will exist on coil C turning IQ501 on and IQ502 off, allowing current to flow from the 16 volt line through resistors IR504 and IR505 (approximately 10K series resistance) into the Sum Node bus. Note that the total precision resistor combination varies inversely with the rank of the matrix, or in other words, the hundred mile matrix series resistance has 1/100 the resistance value of the one mile unit matrix series resistance.

Servo Board #5, in conjunction with Servo Board #4, provides a negative output voltage which is directly proportional to the indicated distance (e.g. zero volts at zero miles and −1.99 volts at 199 miles). This distance voltage is fed to the "KTS–TTS" switch IS602, to Servo Board #1 when time-to-station (TTS) information is to be displayed.

IQ503, IQ504 and IQ505 comprises an operational amplifier which provides a large negative output for a small positive input. All three transistor collector resistors are connected to the +16 v. bus and their emitter resistors connect to a −16 v. bus regulated by Zener diode ICR302 (on Servo Board #3). IQ503 and IQ504 form a differential amplifier with the Sum Node bus providing on input to IQ503's base. IQ504's base connects to the wiper arm of potentiometer IR511, the TTS zero adjust potentiometer.

The negative output of IQ505's collector is fed back to the base of IQ503 through resistor IR506. This negative feedback lowers the effective input impedance of the operational amplifier to only a few ohms. Thus, the amplifier becomes a current sensing device measuring current flow through those precision matrix resistors that are not grounded. The total resistance of all the other precision matrix resistors, in parallel from the Sum Node bus to ground, is so large compared to the low input impedance of the amplifier that the shunting effect is negligible. This effect may be compared to a low resistance milliameter shunted by a resistance many times that of the meter movement, which would have a negligible effect on the meter current.

At an indicated distance of zero miles, the voltage at the collector of IQ505 should be zero. The TTS zero adjust potentiometer IR511 is adjusted to obtain this value. At 199 miles, IQ505's collector voltage should be a −1.99 v. There is no adjustment to calibrate this maximum distance voltage, and its accuracy is dependent upon the precision resistance resistors in the Sum Node output matrix located on Servo Boards #4 and #5. At other distances, the output voltage will be proportional to the distance by the factor of −0.01 v. per nautical mile.

When the DME unit is in the track mode, the drive to the distance readouts is removed for approximately 2.5 out of every 37 milliseconds. The distance voltage from the amplifier goes to zero during the time due to the loss of drive from the matrices. A filter network, consisting of resistor IR517, capacitor IC502, and resistor IR518, removes this notch from the output of IQ505. The result is a jitter-free analog distance input to Servo Board #1 when TTS information is displayed.

It was noted above that the output from Servo Board #3 is a zero to −6.00 v. analog function of velocity. It was also noted that the output from Servo Board #5 is a zero to −2.00 v. analog function of distance. The time-to-station (TTS) display is developed from these two varying inputs by Servo Board #1 and the mechanical components of the Servo sytem.

During velocity display, a well regulated −6.00 v. reference voltage is applied to the ten turn potentiometer IR601. The velocity voltage from Servo Board #3 is applied to the emitter of IQ101 (Chopper). For the TTS display, however, the velocity voltage now becomes the reference voltage for potentiometer IR601 and the distance output from Servo Board #5 is the signal input to the emitter of IQ101 (note FIG. 2). These changes are made by the KTS–TTS switch S602. When S602 is set to the TTS position, the flag appears in the lower window and covers the right-hand counter number (the longest time display is then 59 minutes). The position of potentiometer IR601's wiper arm depends on the proportion of the velocity voltage applied to potentiometer IR601 that is required to equal the distance voltage. When potentiometer IR601's wiper arm is applying the same voltage to IQ602's emitter that is applied to IQ601's emitter by the distance voltage from Servo Board #5, the Servo motor IM601 will stop, as discussed with reference to Servo Board #1. For any distance, if the velocity is zero (as when orbiting a ground station or making bench tests with no change in distance with respect to time), the voltage at the ungrounded end of potentiometer IR604 will be zero. The actual time required to reach the destination in this case is infinity, and potentiometer IR601's wiper arm will rotate to its upper limit as the Servo attempts to find a voltage at the potentiometer arm large enough to match the applied distance voltage.

Many different combinations of distance and velocity may result in the same TTS display. For example, a distance of 100 nautical miles will generate a distance voltage of about 1 volt. 200 knots of velocity will generate a velocity voltage of about 2 volts. Therefore, potentiometer IR601 will be driven to its midpoint to achieve a servo null, corresponding to a display of half of 60 or 30 minutes TTS. Likewise, a distance of 150 nautical miles at a velocity of 300 knots will generate 1.5 or 3 volts, respectively. Potentiometer IR601 will again be driven to its midpoint, causing 30 minutes TTS to be displayed.

For conditions of high velocity and short range, only a small fraction of the velocity across potentiometer IR601 will be required to equal a low range of voltage, so potentiometer IR601's wiper arm will be driven to a point near ground and a low TTS will be displayed.

From the foregoing, it will be seen that this invention is one well adapted to attain all of the ends and objects hereinabove set forth together with other advantages which are obvious and which are inherent to the structure.

Having thus described my invention, I claim:

1. An indicator operable to display time-to-station of an aircraft relative to a station, said Indicator comprising
   means for producing a voltage that is proportional to the velocity of said aircraft relative to said station,
   means for producing a voltage that is proportional to the distance of said aircraft from said station,
   a servo system having at least two input terminals,
   means for applying said velocity voltage to one of said input terminals,
   means for applying said distance voltage to the other of said input terminals, said servo system operating to null said velocity voltage against said distance voltage thereby producing a voltage proportional to the time-to-station of said aircraft relative to said time-to-station, and
   means responsive to said time-to-station voltage for displaying the time-to-station produced by said servo system on said Indicator.

2. The invention as in claim 1 wherein an indication of distance change in preselected units is delivered to said Indicator as said aircraft moves relative to said station, and wherein said velocity voltage producing means includes a precision block generator operable to produce a voltage block with a regulated amplitude for each indicated unit change of distance.

3. The invention as in claim 2 wherein said velocity voltage producing means includes a means for integrating said voltage blocks over a number of unit changes of distance, said integrated voltage thereby being proportional to the velocity of said body relative to said station.

4. An Indicator operable to display the velocity of a moving body relative to a station, said Indicator comprising means for producing an analog voltage output from a digital input, said digital voltage input being derived from a digitally operated DME, said analog voltage being proportional to the velocity of said body relative to said ground station, and means for translating said proportional voltage into a readout so that said Indicator displays said velocity.

5. The invention as in claim 4 wherein an indication of distance change in preselected units is delivered to said Indicator as said body moves relative to said station, and wherein said velocity voltage producing means includes a precision block generator operable to produce a voltage block with a regulated amplitude for each indicated unit change of distance.

6. The invention as in claim 5 wherein said velocity velocity voltage producing means includes a means for integrating said voltage blocks over a number of unit changes of distance, said integrated voltage thereby being proportional to the velocity of said body relative to said station.

7. The invention as in claim 5 wherein said precision block generator comprises a bistable circuit having two stable states, said bistable circuit operable to be set by each said indicated distance change, an emitter follower circuit, said emitter follower being driven into conduction upon the setting of said bistable circuit, means for regulating the output voltage of said emitter follower to a preselected level, and means for controlling the conduction time of said emitter follower to thereby produce an output voltage block of precision amplitude and duration for every said indicated distance change.

8. The invention as in claim 7 wherein said controlling means includes a unijunction relaxation oscillator operating from the output of said regulated emitter follower, said oscillator having its output connected to said bistable circuit so that after a predetermined time from the triggering on of said oscillator, said oscillator output will reset said bistable circuit thereby causing said emitter follower to be non-conducting.

9. The invention as in claim 7 wherein said controlling means includes a unijunction relaxation oscillator, said oscillator having a unijunction transistor therein which assists in determining the frequency of oscillation of said oscillator, said oscillator operating from the output of said regulated emitter follower, a capacitor, said capacitor charge controlling the triggering on or firing of said unijunction transistor, and separate circuit means for controlling the discharge of said capacitor thereby relieving said unijunction transistor of the responsibility of discharging said capacitor.

10. An Indicator for use with Distance Measuring Equipment, said Indicator having a distance readout and a combination velocity and time-to-station display for displaying distance, velocity, and time-to-station of an aircraft relative to a ground station, said Indicator comprising means for producing a voltage that is proportional to the velocity of said aircraft relative to said station, means for producing a voltage that is proportional to the distance of said aircraft from said station, a servo system having at least two input terminals, means for applying said velocity voltage to one of said input terminals, means for applying said distance voltage to the other of said input terminals, said servo system operating to null said velocity voltage against said distance voltage thereby producing a voltage proportional to the time-to-station of said aircraft relative to said time-to-station, means responsive to said time-to-station voltage for displaying the time-to-station produced by said servo system on said Indicator, and switch means having alternate positions for causing said Indicator to display either velocity or time-to-station depending on the positions of said switch means.

11. The invention as in claim 10 wherein distance displayed is changeable in preselected units, and wherein said velocity voltage producing means includes a precision block generator operable to produce a voltage block with a regulated amplitude for each indicated unit change of distance, and a means for integrating said voltage blocks over a number of unit changes of distance, said integrated voltage thereby being proportional to the velocity of said aircraft relative to said ground station.

12. The invention as in claim 10 wherein said distance voltage means includes current mode digital to analog converter, said converter operable to develop an output voltage that is a direct function of the indicated distance.

13. The invention as in claim 10 wherein said servo system includes a two phase AC motor, a precision potentiometer, said potentiometer having a wiper arm that is rotated through its range by said motor, said motor being simultaneously geared to turn counter dials for the display of said velocity and said time-to-station as said wiper arm is moved, a second signal input from said switch means to be compared with the voltage on said wiper arm, and means for rotating said motor in a proper direction until the voltage on said wiper arm approaches the voltage of said signal input.

References Cited
UNITED STATES PATENTS

| | | | |
|---|---|---|---|
| 2,646,924 | 7/1953 | Shuck | 235—150.23 |
| 3,182,498 | 5/1965 | Koletsky et al. | 340—27 |
| 3,321,757 | 5/1967 | Crow et al. | 340—27 |

ALVIN H. WARING, Primary Examiner

H. S. COHEN, Assistant Examiner

U.S. Cl. X.R.

73—178; 235—150.27; 324—68; 343—9